United States Patent Office 2,857,262
Patented Oct. 21, 1958

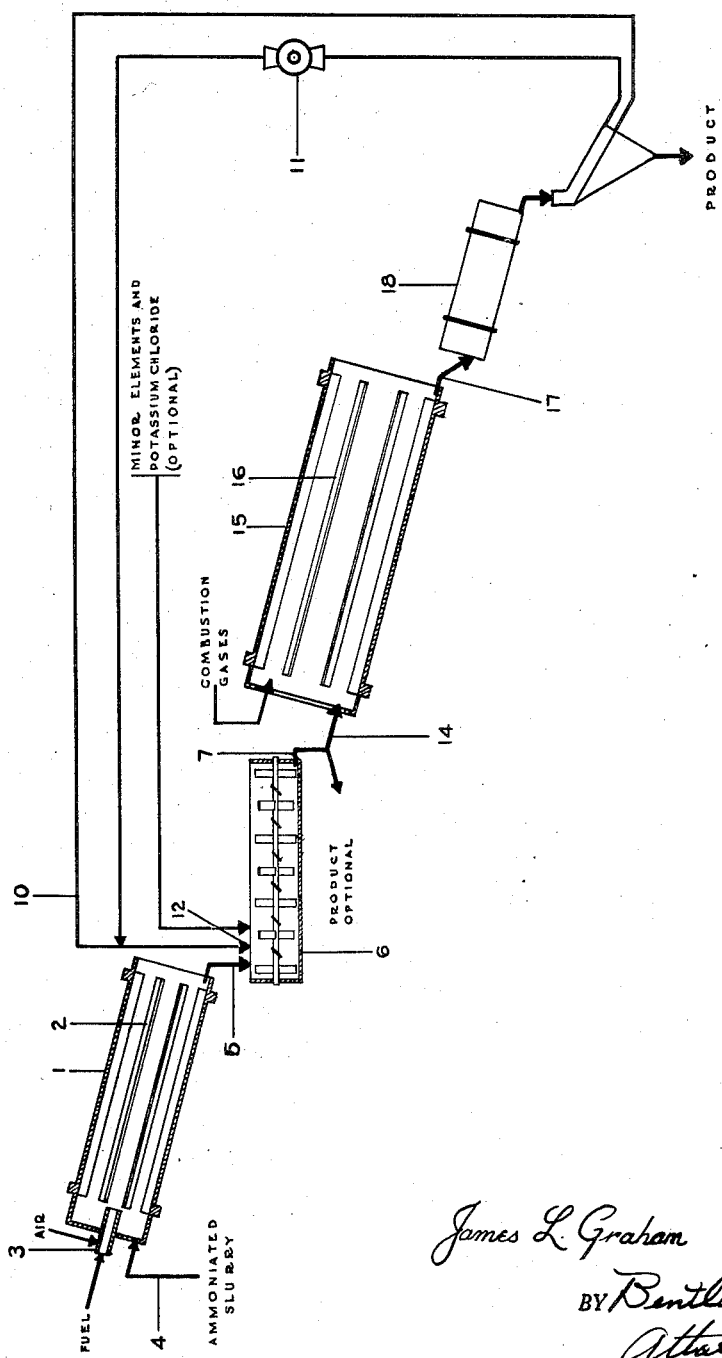

2,857,262

METHOD OF MANUFACTURING FERTILIZERS BY EVAPORATING SLURRIES CONTAINING FERTILIZER CONSTITUENTS

James L. Graham, Florence, Ala., assignor to Tennessee Valley Authority, a corporation of the United States Application September 11, 1952, Serial No. 309,155

6 Claims. (Cl. 71—39)

(Granted under Title 35, U. S. Code (1952), sec. 266)

This invention relates to improved methods for evaporating water from slurries produced in the manufacture of fertilizers from phosphate rock, nitric acid, and ammonia, with or without the addition of other fertilizer ingredients.

These materials are used in the production of fertilizers generally known as nitric phosphates. It has long been known that it would be more economical to make fertilizers by combination processes involving acidulation of phosphate rock with nitric acid than to prepare phosphatic and nitrogenous fertilizer materials separately. However, mere acidulation of phosphate rock with nitric acid is impractical. The product is extremely hygroscopic, corrosive, and is too unstable to dry. It was also known that the presence of calcium nitrate in large proportion was the principal cause of the undesirable properties of this product, and that the product would be hygroscopic and unstable if more than 3 percent calcium nitrate was present.

It was known that it was possible to remove excess calcium nitrate by converting its calcium content into an insoluble salt and methods for doing so were proposed, e. g., U. S. Patent 1,916,429, but early procedures were generally expensive, involved difficulties in operation, and were not commercially successful. As a result, little interest was shown in such processes in this country for many years.

Interest revived, however, on publication of FIAT final report No. 718 in 1946, and an article by Quanquin, Industrie Chimique, volume 34, pp. 165–7. These publications describe processes of the type in which phosphate rock is acidulated with a mixture of nitric and phosphoric acids; the phosphoric acid being present in sufficient quantity to precipitate substantially all calcium as dicalcium phosphate. The resulting slurry is then ammoniated and dried, with or without addition of potash. The Tennessee Valley Authority began small-scale work to determine optimum operating conditions in such processes in 1946 and completed pilot-plant work on such processes involving acidulating phosphate rock with mixed nitric and phosphoric acids in the spring of 1949.

Interest in the nitric phosphate processes was further increased by subsequent publication of three articles, namely, an article by Hignett describing four types of nitric phosphate processes in general terms and giving their chemistry in detail, in Chemical Engineering, May 1951; an article describing operation of nitric phosphate processes in detail, but limited to use of mixed nitric and phosphoric acids in the acidulation step, published in Industrial and Engineering Chemistry, volume 43, p. 2413, October 1951; and a detailed description of a nitric phosphate process in which mixed nitric and sulfuric acids are used for the acidulation of phosphate rock, published in Industrial and Engineering Chemistry, volume 44, p. 236, January 1952. My invention is particularly applicable to the processes described in the last two articles.

In such manufacturing processes, slurries are produced which can be characterized in general terms as containing:

| | Percent |
|---|---|
| Ammonium nitrate | about 20–40 |
| Dicalcium phosphate | about 16–24 |
| Diammonium phosphate | about 1–4 |
| Calcium sulfate | about 0–16 |
| Calcium nitrate | about 0–3 |
| Potassium nitrate | about 0–11 |
| Acids insolubles | about 1–4 |
| Water | about 30–36 | although small quantities of other materials may be present and, in some cases, proportions of the ingredients listed above may vary somewhat from those stated.

One of the most difficult problems encountered in such manufacturing processes is that of evaporating the slurries to substantial dryness. At least 50 percent, and usually more, of the dry matter contained in the slurry is solid at all ordinary drying temperatures.

As produced, the slurries may vary in consistency from that of a thin fluid to a thick paste, depending mainly on the concentration of nitric acid or mixture of nitric and other acids used for extracting the phosphate rock. The principal salts present are dicalcium phosphate and ammonium nitrate, the latter a material that is known to decompose rapidly at 380° F. and to be dangerous to handle at high temperatures. As drying progresses the slurry becomes a heavy suspension of solids in a very concentrated solution of ammonium nitrate. Since it is usually desired to produce a product containing not more than 1 percent water, high-temperature drying by direct contact with combustion gases has not been used because of the general belief that such concentrated slurries are not only so lacking in fluidity that high temperature treatment of them would cause localized overheating and decomposition, but are also so likely to freeze as to be difficult to handle in subsequent steps.

In the drying method most widely used at present, the ammoniated slurry is mixed with previously dried product to form moist granules containing from 5 to 6.5 percent moisture. These granules are then introduced into a rotary dryer and are dried in solid stage at a temperature near their softening point to a moisture content of not more than 1 percent. The resulting dry granules are then cooled and screened to separate the particles into the size range desired for the product. Oversize particles are crushed, mixed with undersize material, and recycled for mixing with incoming slurry. Since a very large amount of recycled material is necessary to form granules of the required moisture content, it is frequently necessary to crush and recycle much material that is within the size range desired for the product.

When this method is used, it is necessary to recycle from 80 to 90 percent of dried material for mixing with incoming slurry. This process is quite costly, since the heat utilization is very poor; about 2300 B. t. u. are required per pound of product, because the recycled material must be cooled before it can be screened satisfactorily and the heat lost must be restored in the dryer. The cost of drying equipment also is high, because a plant must include a dryer of sufficient size to handle from 4 to 9 times the tonnage of material produced by the plant.

Drying of such slurries has also been carried out in steam-jacketed, agitated kettles. Although thermal efficiency of this type equipment is reasonably good, the capacity of the kettles is low because of severe foaming, and it is necessary to operate them batchwise.

Double- and twin-drum dryers have also been used with some success. Equipment costs are high, however, and since heat must be furnished by steam, which is a more costly source of heat than combustion gases, the over-all drying costs are high.

It is an object of this invention to provide a high-temperature method for evaporating water from slurries of the type described above, which has low fuel requirements and does not cause appreciable decomposition of the ammonium nitrate present therein.

Another object is to provide such method which can be operated continuously.

Still another object is to provide such method which is cheap and simple in operation and which may be carried out with relatively small investment in equipment.

I have found that such slurries have certain hitherto unappreciated fluidity-boiling point characteristics. All such slurries, although about 50 percent of slurry solids are of materials that are solid at all ordinary drying temperatures, remain so mobile that water may be evaporated from them to a total moisture content of less than 1 percent to about 15 percent, depending upon the composition of the slurry, by direct contact with hot combustion gases having temperatures far above the temperature of decomposition of ammonium nitrate without appreciable decomposition. Such slurries are so mobile that the heat absorbed under such conditions is substantially all utilized in supplying heat of vaporization and there need not be any localized overheating.

The reason for this high degree of mobility is not entirely clear. It has been known that ammonium nitrate containing only 1 or 2 percent water becomes liquid when heated to a temperature somewhat below its decomposition point; but this liquid state is converted into a pasty solid by addition of a small amount of a solid material such as calcium sulfate. I have found that the large amounts of phosphates and nitrates, together with smaller amounts of acid insolubles, calcium fluoride, etc., although solids at the temperatures used, do not destroy the mobility of the liquid ammonium nitrate present in the slurries.

Based on this discovery I have provided a simple process for utilizing the fluidity-boiling point characteristics of such slurries. Briefly, this process comprises introducing a slurry of the composition described above into an evaporation zone, preferably a direct-fired rotary dryer equipped with lifting flights; therein agitating and intimately contacting the slurry with hot combustion gases having a temperature in the range of about 2500° F. to about 400° F., which is far above the decomposition point of ammonium nitrate; and withdrawing a fluid slurry containing less than 1 percent to about 15 percent moisture into a granulating zone. Those slurries that contain not more than about 2 percent calcium sulfate can be dried to a moisture content of 1 percent or less by direct contact with hot combustion gases and require no further treatment other than cooling and granulation.

When the slurry is high in calcium sulfate, 15–16 percent for example, it cannot be dried below about 15 percent moisture content without becoming pasty and subject to localized overheating with resulting decomposition. It is necessary to mix such slurries after concentration to about 15 percent moisture content with sufficient previously dried material to form solid granules that can be passed through a second drying stage to yield a product having a moisture content of 1 percent or less.

When the calcium sulfate content is intermediate, the slurry may be concentrated to a moisture content of between 1 and 15 percent, frequently 4 to 8 percent, mixed with previously dried material, and dried. The saving in heat required for drying, when mixing with previously dried material and second-stage drying are necessary, is only about one-third to one-half the total B. t. u. per pound of product required by the method most commonly used in the industry, but may be much greater with slurries that do not require second-stage drying.

In the attached drawing the single figure illustrates diagrammatically one type of equipment found to be very efficient for carrying out my process. The reference numeral 1 therein indicates a rotary dryer equipped with lifting flights 2. A suitable fuel is burned in burner 3 and the hot combustion gases are passed through the interior of dryer 1 at temperatures in the range from about 2500° F. to 400° F. Slurry of the composition described above is introduced by suitable means at 4 and passed onward through dryer 1. Lifting flights 2 serve as a means for agitating the slurry and intimately contacting it with hot combustion gases throughout the evaporation or concentration zone defined by dryer 1. Fluid slurry having a moisture content of less than 1 percent to about 15 percent is withdrawn at 5 to a granulation zone 6, which is preferably a paddle-type mixer as illustrated. The benefits derived from intimate contact of the slurry with high temperature combustion gases are rapid and efficient drying, low consumption of fuel, low equipment costs, and low labor costs.

Cocurrent passage of combustion gases and slurry through evaporating zone 1 is preferred because this results in contact of gases at highest temperature with slurry of highest moisture content; but with many slurries countercurrent contact may also be used.

The fluid slurry is cooled and granulated during its passage through mixer 6. Some further evaporation of water occurs during this stage, and the percentage of water may be further reduced by the addition of potassium chloride or "minor element" salts, if these materials are desired in the fertilizer produced. When the moisture content is only about 2 to 3 percent at incipient pastiness of the fluid slurry, evaporation of water during cooling and granulation in granulating zone 6, together with reduction in moisture content due to addition of other fertilizer ingredients, is sufficient that the resulting granules may be withdrawn as product.

It is highly important, however, that potassium chloride not be added to the slurry prior to its passage through evaporating zone 1. The high temperatures (of the order of about 400° to 2500° F.) encountered in this zone cause a slurry containing as little as 4 percent potassium chloride to undergo decomposition accompanied by evolution of nitrogen oxides and this decomposition, once initiated, cannot be stopped by lowering the temperature to any practical extent. Potassium sulfate, however, can be added to the slurry prior to its introduction into dryer 1 if desired.

When the slurry being processed is low in calcium sulfate, the moisture content will be 1 percent or less by the time the slurry reaches the outlet 7 of granulation zone 6. In this case the granules are merely withdrawn as product. If the slurry is sufficiently high in calcium sulfate that incipient pastiness is reached in zone 1 while the moisture content is far above 1 percent, it must be discharged into granulation zone 6 at that stage and may require further treatment.

If the fluid slurry reaches a stage of incipient pastiness when the moisture content is from about 3 to 6.5 percent, it may be cooled, granulated, and dried by direct contact with combustion gases in drying zone 15 at a temperature below the softening point of the granules, usually below 500° F.

When the calcium sulfate content is high, incipient pastiness may be reached at a moisture content in the range from 6.5 to 15 percent. In that case previously dried material, which may be fines recycled by suitable means 10, and/or oversize materials first conducted to a crusher 11 are introduced into granulation zone 6, preferably at a point 12 where the slurry is still fluid. Sufficient previously dried material should be used so that the moisture content of granules withdrawn at 7 does not exceed 6.5 percent.

Such granules, which may include minor elements and potassium chloride added during granulation, are introduced at 14 into a second drying zone 15, which is preferably a rotary dryer equipped with lifting flights 16. A stream of combustion gases is introduced into dryer 15 at a temperature of about 500° F. and will ordinarily issue from the dryer at about 275° F. or more. During passage of the granules through the dryer 15 they are cascaded and intimately mixed with the combustion gases. Water is evaporated at this comparatively low temperature, and granules containing not more than 1 percent moisture are withdrawn at 17 to a cooling stage 18. The granules then are screened to separate those of desired product size from oversize and undersize materials which may be recycled to granulating zone 6.

In the following examples additional details of operation are given. Example I shows operation of the method most widely used in the industry and is to be contrasted with Examples II, III, and IV which show operation by my novel process upon various slurries produced in typical fertilizer operations. Since one important factor affecting the heat requirements for drying slurries is the water content, slurries having approximately equivalent water contents are considered in all examples.

*Example I*

An extensive study of the known methods for drying slurries of the type produced in the processes described above had shown that the method in which moist granules, formed by mixing ammoniated slurry with previously dried material, and dried in a direct-fired rotary drier was the best method from the standpoints of technical feasibility and economy.

Tests of this method had shown that, to prevent sticking of material in the drier, the moisture content of the granules charged to the drier could not exceed about 6.5 percent. It was found also that the moisture content of the material leaving the drier should be 1.0 percent or less in order to yield a satisfactory product. A low moisture content was desired also to hold to a minimum the amount of dried material to be recycled.

In a test of this method, a slurry that contained 29.4 percent $NH_4NO_3$, 18.3 percent $CaHPO_4$, 16.2 percent $CaSO_4$, 2.6 percent acid insoluble, 1.6 percent ammonium phosphate, 0.7 percent $CaF_2$, 0.1 percent $Ca_3(PO_4)_2$, and 31.1 percent water (calculated from chemical analysis) was prepared by reacting phosphate rock with a mixture of nitric and sulfuric acids and treating the extract slurry with ammonia. This slurry was treated in the following manner to form material that could be handled in a rotary drier.

Previously dried product was fed at a rate of 1740 pounds per hour into a rotary tumbler 3 feet in diameter by 6 feet long. Commercial potassium chloride (61% $K_2O$) also was introduced into the tumbler at a rate of 55 pounds per hour. The ammoniated slurry was sprayed at a rate of 315 pounds per hour onto the bed of previously dried material and potassium chloride in the tumbler. The rate at which potassium chloride was added was that calculated to combine with the incoming ammoniated slurry to give a product containing N, $P_2O_5$, and $K_2O$ in the proportions of 1:1:1. The previously dried material, which was of the same composition as the ammoniated slurry plus potassium chloride, was added at a rate that would give a moisture content of 5.5 percent in the material discharged from the tumbler.

The action of the tumbler formed the materials into homogeneous, moist granules. These granules were fed from the tumbler to a rotary drier 3 feet in diameter and 24 feet long. The drier was a direct, gas-fired unit, equipped with eight flights, and was operated a tabout 5 revolutions per minute with a slope of 0.17 inch per foot. Carbon monoxide gas having a heating value of 300 B. t. u. per cubic foot was burned as fuel. Granules and heating gases were passed cocurrently through the drier to permit the use of higher inlet-gas temperatures without danger of overheating the material. The inlet-gas temperature was 500° F. and the exit-gas temperature was 290° F. Most granules entered the drier at 125° F. Carbon monoxide gas was burned at a rate of 2,000 cubic feet per hour.

Dry material having a moisture content of 1.0 percent was discharged from the drier at a rate of 2,000 pounds per hour. The material was cooled to a temperature of about 120° F. and then was screened to separate material within a size range of minus 6-mesh plus 50-mesh. It had been found necessary to cool material of this type prior to screening to minimize clogging of the screens. A total of 1740 pounds of material, comprising the screen oversize and undersize plus a portion of the product size, was recycled to the tumbler, leaving 260 pounds of product.

The heat required to obtain a dry product (1.0% moisture) by this method was 2300 B. t. u. per pound of product. This low rate of production, 260 pounds per hour, high fuel requirement, 2300 B. t. u. per pound, and necessarily high equipment and labor costs characterize the methods of the prior art as typified by the process described in this example. These results are presented for contrast with results obtained in processes operated according to principles of my invention and set forth in the following Examples II, III, and IV.

*Example II*

A slurry containing 39.4 percent $NH_4NO_3$, 22.8 percent $CaHPO_4$, 0.8 percent acid insoluble, 3.5 percent ammonium phosphate, 2.6 percent $CaF_2$, 0.6 percent $Ca_3(PO_4)_2$, and 30.3 percent water, as calculated from chemical analysis, was prepared by extracting phosphate rock with a mixture of nitric and phosphoric acids and ammoniating the extract slurry. The slurry was fed at a rate of 882 pounds per hour to a rotary drier 18 inches in diameter by 10 feet in length. The drier was equipped with eight flights, was mounted at a slope of 0.3 inch per foot, and was operated at a speed of about 20 revolutions per minute. Carbon monoxide gas having a heating value of 300 B. t. u. per cubic foot was used as fuel, and the hot combustion gases and material traveled cocurrently through the drier.

Slurry entered the drier at a temperature of about 200° F. and discharged at 310° F. Inlet- and exit-gas temperatures were about 1200° F. and 470° F., respectively. Material leaving the drier had a moisture content of 1.2 percent, and was in the form of a very fluid slurry.

The hot, fluid slurry leaving the drier was fed to a double-shaft paddle mixer having a shell 6 feet long by 15 inches wide by 10 inches deep. The material was cooled and granulated in the paddle mixer. A stream of air was directed onto the material in the paddle mixer to assist in cooling.

During the cooling and granulation step the material lost additional moisture, so that the final moisture content of the material was 0.8 percent. The nominal formula of the material produced in this example was 19–19–0. Fuel consumption was equal to 975 B. t. u. per pound of product.

Other drying tests of material produced from phosphate rock, nitric acid, phosphoric acid, and ammonia showed that products varying in composition from 12–33–0 to 19–19–0 could be dried in the manner described to moisture contents of 1.0 percent or less. The 18-inch by 10-foot drier was capable of handling up to 800 pounds of product per hour. Fuel consumption in some of the tests was as low as 795 B. t. u. per pound of product.

In other tests potassium chloride was added to the fluid in the feed end of the paddle mixer to give fertilizers having nominal formulas such as 15–19–10 and 14–14–14. The heat required to dry a 14–14–14 product by my novel process is from 600 to 740 B. t. u. per pound of final product.

*Example III*

A slurry containing 20.6 percent $NH_4NO_3$, 16.5 percent $CaHPO_4$, 7.7 percent $CaSO_4$, 3.0 percent $Ca(NO_3)_2$, 11.3 percent $KNO_3$, 1.0 percent acid insoluble, 2.0 percent $CaF_2$, 0.6 percent $Ca_3(PO_4)_2$, 1.6 percent iron and aluminum compounds, and 35.7 percent water, as calculated from chemical analysis, was prepared by extracting phosphate rock with nitric acid and simultaneously adding ammonia and potassium sulfate to the extract slurry. Potassium sulfate was added in an amount sufficient to eliminate about 70 percent of the calcium nitrate that would have been present in the ammoniated extract slurry had no potassium sulfate been added.

The ammoniated slurry was fed to the 18-inch by 10-foot drier described in Example II at a rate of 1000 pounds per hour. Slurry entered the drier at a temperature of 120° F. and left at 235° F. Inlet- and exit-gas temperatures were 1550° and 400° F., respectively. Carbon monoxide gas was burned at a rate of 2100 cubic feet per hour. The slurry leaving the drier was very fluid and had a moisture content of 9.2 percent.

The concentrated slurry was introduced into the double-shaft paddle mixer described in Example I (6' x 15" x 10"). Potassium sulfate containing 50 percent $K_2O$ was fed to the mixer at a rate of 108 pounds per hour. Previously dried material, having the same composition as that of the incoming slurry plus the added potassium sulfate, was added to the mixer at a rate of 1200 pounds per hour. The dry material contained 1.0 percent moisture. During the mixing operation the calcium nitrate in the incoming slurry reacted with part of the potassium sulfate to form potassium nitrate and calcium sulfate.

Material was discharged from the mixer in the form of moist granules containing 4.0 percent moisture. The granules were fed to a second-stage rotary drier 31 inches in diameter by 10 feet long. The material entered the drier at a temperature of 115° F. and left at 135° F. The temperatures of the inlet and exit gases were 450° and 140° F., respectively. Carbon monoxide was burned at a rate of 1140 cubic feet per hour.

Dry material containing 1.0 percent moisture was discharged from the second-stage drier at a rate of 1940 pounds per hour. The material was screened to separate material within the desired product size range. Oversize and undersize material was recycled to the paddle mixer. The net rate of production was 740 pounds per hour. The fertilizer produced had a nominal formula of 12–12–12.

The total heat required to dry the ammoniated slurry from 35.7 percent moisture to 1.0 percent was equal to 1300 B. t. u. per pound of product.

*Example IV*

In another test a slurry that contained 29.4 percent $NH_4NO_3$, 18.3 percent $CaHPO_4$, 16.2 percent $CaSO_4$, 2.6 percent acid insoluble, 1.6 percent ammonium phosphate, 0.7 percent $CaF_2$, 0.1 percent $Ca_3(PO_4)_2$, and 31.1 percent water was prepared by reacting phosphate rock with a mixture of nitric and sulfuric acids and treating the extract slurry with ammonia. The ammoniated slurry was introduced into an 18-inch by 10-foot concentrator (the drier described in Example II) that was fitted with a full-length scraper bar which served to remove material adhering to the concentrator wall. The rate of slurry input was 1150 pounds per hour.

Slurry entered the concentrator at a temperature of about 190° F. and discharged at a temperature of 230° F. The heating gases entered the concentrator at a temperature of about 2200° F. and left at about 700° F. The slurry, upon entering the concentrator, was highly fluid, and as it passed through the concentrator it became progressively less fluid. At the point of discharge the material was in the form of a thick paste. The moisture content at this point was 14.6 percent. Carbon monoxide gas was burned in the first-stage concentrator at a rate of 2640 cubic feet per hour.

Ammoniated slurry was introduced into the double-shaft paddle mixer described in Example II at a rate of 710 pounds per hour. Commercial potassium chloride (61% $K_2O$) was added to the mixer at a rate of 155 pounds per hour, which was calculated to give a product that contained N, $P_2O_5$, and $K_2O$ in the proportions of substantially 1:1:1. Previously dried material having the same composition as the incoming ammoniated slurry plus potassium chloride was added at a rate of 1245 pounds per hour. The moisture content of the previously dried material was 1.0 percent.

The mixture of slurry, potassium chloride, and dry material was formed into moist, homogeneous granules containing 5.5 percent moisture. These granules were charged at a rate of 2110 pounds per hour to the 3-foot by 24-foot rotary drier described in Example I. The moist granules entered the drier at a temperature of 120° F. and discharged at 275° F. Temperatures of the inlet and exit gases were 500° and 290° F., respectively. Carbon monoxide gas was burned at a rate of 2000 cubic feet per hour.

Material containing 1.0 percent moisture left the drier at a rate of 2000 pounds per hour. This material was cooled and screened to separate material of the desired size range for product. The oversize and undersize plus a small amount of product-size material (minus 6 mesh, plus 50-mesh in this example), were combined to give the necessary amount of recycled material for the production of moist granules in the paddle mixer, namely, 1245 pounds per hour. The net production rate, therefore, was 755 pounds per hour.

Fuel consumption was equivalent to 1050 B. t. u. per pound of final product in the concentrator and 795 B. t. u. per pound of final product in the drier. The total heat requirement per pound of product was, therefore, 1845 B. t. u.

I claim as my invention:

1. In a nitric phosphate process for the production of fertilizer from materials comprising phosphate rock, nitric acid, and ammonia wherein a slurry containing about 20 to 40 percent ammonium nitrate, about 16 to 24 percent dicalcium phosphate, about 1 to 4 percent monoammonium phosphate, 0 to about 16 percent calcium sulfate, 0 to about 3 percent calcium nitrate, 0 to about 11 percent potassium nitrate, about 1 to 4 percent acid insoluble materials, and about 30 to 36 percent water is produced and the slurry is dried, that improvement which comprises introducing such slurry into an evaporating zone without addition of potassium chloride; therein agitating and intimately contacting said slurry with hot combustion gases at temperatures in the range from about 2500° F. to about 400° F.; and withdrawing a resulting fluid slurry containing from less than 1 percent to about 15 percent moisture.

2. In a nitric phosphate process for the production of fertilizer from materials comprising phosphate rock, nitric acid, and ammonia wherein a slurry containing about 20 to 40 percent ammonium nitrate, about 16 to 24 percent dicalcium phosphate, about 1 to 4 percent monoammonium phosphate, 0 to about 16 percent calcium sulfate, 0 to about 3 percent calcium nitrate, 0 to about 11 percent potassium nitrate, about 1 to 4 percent acid insoluble materials, and about 30 to 36 percent water is produced and the slurry is dried, that improvement which comprises passing such slurry through an evaporating zone without addition of potassium chloride; passing a stream of combustion gases at temperatures in the range from about 2500° F. to 400° F. through said evaporating zone concurrently with said slurry; therein agitating and intimately contacting said slurry with said hot combustion gases; and withdrawing a resulting fluid slurry containing from less than 1 percent to about 15 percent moisture.

3. The process of claim 2 wherein a slurry containing not more than 2 percent calcium sulfate is agitated and intimately contacted with the hot combustion gases in the evaporating zone and a resulting fluid slurry containing about 1 percent moisture is withdrawn.

4. The process of claim 2 wherein a concentrated fluid slurry containing from about 2 to 3 percent moisture is withdrawn into a granulating zone; other fertilizer ingredients are added; and the resulting mixture is cooled and granulated with further evaporation of water.

5. The process of claim 2 wherein a concentrated fluid slurry containing from about 3 percent to 6.5 percent moisture is withdrawn into a granulating zone; the slurry is there cooled and formed into granules; and the resulting granules are dried by direct contact with combustion gases having temperatures below the softening point of said granules.

6. The process of claim 2 wherein a concentrated fluid slurry having a moisture content in the range from about 6.5 percent to 15 percent is withdrawn into a granulating zone; sufficient previously dried product is added to reduce the moisture content of the resulting mixture to 6.5 percent; the mixture is granulated; and the resulting granules are dried by direct contact with combustion gases having temperatures below the softening point of said granules.

References Cited in the file of this patent

UNITED STATES PATENTS

| | | |
|---|---|---|
| 1,986,293 | Shoeld | Jan. 1, 1935 |
| 2,167,432 | Cox et al. | July 25, 1939 |
| 2,232,145 | Shoeld | Feb. 18, 1941 |
| 2,287,759 | Hardesty et al. | June 23, 1942 |
| 2,448,126 | Shoeld | Aug. 31, 1948 |
| 2,568,901 | Stengel | Sept. 25, 1951 |
| 2,589,734 | Ruosch | Mar. 18, 1952 |
| 2,598,658 | Proctor et al. | May 27, 1952 |
| 2,611,691 | Tramm | Sept. 23, 1952 |
| 2,631,084 | Robinson | Mar. 10, 1953 |
| 2,657,977 | Stengel | Nov. 3, 1953 |
| 2,673,795 | Hudson | Mar. 30, 1954 |

FOREIGN PATENTS

| | | |
|---|---|---|
| 338,079 | Great Britain | Nov. 13, 1930 |